United States Patent [19]

Kaura

[11] Patent Number: 5,733,448

[45] Date of Patent: Mar. 31, 1998

[54] MANUALLY PRESSURIZED WATER FILTERING CONTAINER

[76] Inventor: Kamaljit S. Kaura, 30 Coronado Pointe, Laguna Niguel, Calif. 92677

[21] Appl. No.: 806,911

[22] Filed: Feb. 26, 1997

[51] Int. Cl.[6] .................. B01D 35/26; B01D 29/90
[52] U.S. Cl. .......... 210/238; 210/244; 210/282; 210/416.3; 210/450; 210/477; 210/479; 210/474; 210/489
[58] Field of Search ................ 210/244, 245, 210/246, 238, 282, 416.3, 489, 492, 479, 477, 474, 450, 482

[56] References Cited

U.S. PATENT DOCUMENTS

| 944,395 | 12/1909 | Wiggenhorn . | |
|---|---|---|---|
| 2,167,225 | 7/1939 | Eweyk . | |
| 2,761,833 | 9/1956 | Ward . | |
| 3,536,197 | 10/1970 | Ward . | |
| 3,715,035 | 2/1973 | Teeple . | |
| 3,823,824 | 7/1974 | Close . | |
| 4,054,526 | 10/1977 | Muller | 210/245 |
| 4,277,333 | 7/1981 | Coppola . | |
| 4,441,996 | 4/1984 | Hurst | 210/241 |
| 4,477,347 | 10/1984 | Sylva | 210/232 |
| 4,529,511 | 7/1985 | Breeden . | |
| 4,749,484 | 6/1988 | Greenhut | 210/266 |
| 4,777,137 | 10/1988 | Lemonnier | 435/299 |
| 4,895,655 | 1/1990 | Schindler | 210/411 |
| 4,983,286 | 1/1991 | Inagaki | 210/257 |
| 5,310,085 | 5/1994 | Lontrade | 222/1 |
| 5,362,385 | 11/1994 | Klegerman | 210/136 |

*Primary Examiner*—Thomas M. Lithgow
*Attorney, Agent, or Firm*—Gene Scott - Patent Law & Venture Group

[57] ABSTRACT

Two chambers in a container are separated by an easily replaced filter. One of the chambers is capable of being compressed so as to pressurize a water volume in the chamber which is to be filtered. The water is therefore forced through the filter into the second of the chambers where it is stored for use in a clean and drinkable form. The filter is made-up of a series of discs arranged to effectively remove particulate, chemical and other undesired contents of the water. The filtered water may be filtered to the molecular level providing an essentially sterile drinking water. The filter may also remove odor and taste components that are undesirable. The filter is constructed and held within the container in such a manner as to prevent seepage and leakage of the unfiltered water.

17 Claims, 3 Drawing Sheets

MANUALLY PRESSURIZED WATER FILTERING CONTAINER

BACKGROUND OF THE INVENTION

1. Field of the Invention

This invention relates generally to water filtering and devices for accomplishing the filtration of water for drinking, and more particularly to a portable container for holding a supply of water and for forcing the water through a filter assembly by pressing upon the container manually so that the filtered water is available within the container for drinking.

2. Description of Related Art

The following art defines the present state of this field:

Lontrade et al, U.S. Pat. No. 5,310,085, shows a liquid enclosed in a resiliently deformable container, the neck of which has a micro filtering membrane which is permeable to the liquid but impermeable to air when wet. Since the container resiliently recovers its shape after it is deformed, the liquid remaining in contact with the outside of the membrane after use is sucked back in and the membrane is kept moist until the next time the container is used.

Klegerman et at, U.S. Pat. No. 5,362,385, shows a personal, portable water filtering device is provided for use in filtering water taken from public drinking fountains, public wash basins or other public water sources. The preferred device includes a flexible attachment means for engaging the outlet of a water fountain, a tube connecting the attachment piece to a pump disposed between two check valves, a filter disposed between or within the pump and a tube connecting the filter to a mouthpiece. The user inserts the attachment means into the outlet of a water fountain or standing water supply which allows water to proceed up the first tube and into the hand-pump. The user then squeezes the hand-pump which forces water through the filter and the filtered water exits through the mouthpiece into the user's mouth. The device is lightweight and collapsible and will fit into the back pocket of athletic wear worn by joggers or other athletes.

Inagaki et al, U.S. Pat. No. 4,983,286, shows a sterilizing water-purifying reagent for removing muddiness of water to be treated or sterilizing the water to be treated as drinking water in fields or under drinking water shortage environment, and the sterilizing water-purifying reagent comprises an acidic additive containing as main ingredients various types of metal salts and nonmetal salts produced by dissolving vermiculite weathered from mica mineral or soil further weathered from the vermiculite in aqueous inorganic acid solution.

Lemonnier, U.S. Pat. No. 4,777,137, shows a method and apparatus for the microbiological testing of liquids to identify and count living microorganisms contained therein includes a tubular sleeve for collecting the liquid sample to which there is attached at one end a microporous membrane filter. Each end of the sleeve has the shape of a female receptacle portion where into one end a container housing a culture medium can be nester by force for applying the medium to the underside of the filter and where into the other end a cover can be nested to provide a substantially tight sealing of the device. Preferably, the tubular sleeve is in the form of a bellows the convolutions of which can be either compressed or expanded to correspondingly alter the volume of the sleeve between minimum and maximum values.

Sylva, U.S. Pat. No. 4,477,347, shows a portable water purifier having a filter housing adapted to contain a replaceable filter assembly to which filter housing is releasably attached an unfiltered water chamber with a pressurizing pump located on the top thereof. A cup member is releasably attached to the unfiltered water chamber covering the pressurizing pump and a cap member is releasably attached beneath the filter housing when the portable water purifier is in its storage mode. When the portable water purifier is in its use mode, the cap is removed from the base of the filter housing and attached to the bottom of the cup and the cup is removed from its position covering the pressurizing pump and attached to the filter housing at the position where the cap was attached. Water to be filtered is placed in the unfiltered water chamber when it is disengaged from the filter housing and after reattachment thereto the pressurizing pump is manually operated to create pressure in the unfiltered water chamber forcing the unfiltered water through the filter and into the cup.

Hurst, U.S. Pat. No. 4,441,996, is an apparatus for producing drinking water from bacteria contaminated cold water is provided. The cold contaminated water is placed into a flexible collector having a sub-micron porous filter in the bottom. When the flexible collector is squeezed, the pressure forces the contaminated water through the filter and into a holding chamber. The drinkable filtered water is removed from the holding chamber through a sterile exit opening.

Muller, U.S. Pat. No. 4,054,526, shows a bottle for treating water by passing water through a treatment cartridge in the top of the bottle, the cartridge containing for example activated charcoal to remove chlorine and/or cationic resin to soften the water. The water in the bottle is pressurized by means of a spring-urged slidably sealed piston or manually operated pump or the like, and a valve manually operable from the exterior of the bottle regulated the flow rate of the discharge of the water from the bottle.

Toida et al, U.S. Pat. No. 4,990,254, shows a portable water purifier comprising an outer elongated hollow body having openings formed at the upper and lower portions, a cup adapted to be inserted in the outer elongated hollow body from the lower opening thereof, a filtering elongated hollow body adapted to be inserted in a cup from the upper opening of the outer elongated hollow body, and a cap fitted detachably on the upper portion of the outer elongated hollow body to cover this upper opening. The cup and the filtering elongated hollow body are accommodated in the outer elongated hollow body when the portable water purifier is not used in a portable manner. When this portable water purifier is used, the cup is pulled out from the outer elongated hollow body and is set under the outer elongated hollow body, so that water is poured from the upper opening of the outer elongated hollow body and is filtered through a filter in the filtering elongated hollow body. The filtered water is stored in the cup.

Greenhut, U.S. Pat. No. 4,749,484, shows a filter apparatus, which is especially useful in filtering out chemicals from tap water. The filter includes upper and lower vessels and a filter assembly between them which includes activated charcoal for absorbing chemicals. The filter assembly includes a filter housing with inlet holes near the bottom of the upper vessel and a filter vent near the top of the upper vessel for releasing gas produced during filtering through the activated charcoal. A ring-shaped preliminary filter lies around the inlet holes, to avoid blocking the upward passage of gas through the vent. The filter extends partially through the holes, to lie closely along the path of upwardly-flowing gas bubbles, so the bubbles tend to drag along gas forming at the inside of the preliminary filter. A cap assembly on the upper vessel permits the escape of vented gas while avoiding splashing. The container is preferably placed in a refrigerator during filtering, to aid in adsorption of chemicals.

Schindler, U.S. Pat. No. 4,895,655, shows a filtration apparatus comprising a vessel divided into two chambers by a filter. An inlet orifice is provided in the vessel for liquid to be filtered, as well as an outlet orifice for the filtered liquid. A distributor device movable from the exterior of the vessel between a filtration position and a rinsing position is arranged in the vessel. In the filtration position of the distributor liquid is filtered into the first chamber, which the liquid leaves by passing through the filter, to penetrate into the second chamber, which it leaves, in the filtered condition, through the outlet orifice. In the rinsing position the liquid flows directly into the second chamber and passes through the filter in the reverse direction to penetrate into the first chamber which it leaves charged with impurities to be eliminated by an escape orifice arranged in the vessel.

The prior art teaches the use of portable water filtration devices and of the use of a bellows wall capable of hand pressurizing a water volume to be filtered. However, the prior art does not teach that such a device can be made in the manner set forth in the present embodiment, and fails to teach a manner in which a filter may be mounted and sealed in such a mount and yet be available for quick and easy release for cleaning or replacement. The present invention fulfills these needs and provides further related advantages as described in the following summary.

SUMMARY OF THE INVENTION

The present invention teaches certain benefits in construction and use which give rise to the objectives described below.

The present invention provides a two chambered container separated by an easily replaced filter. One of the chambers is capable of a designed compression so as to pressurize a water volume to be filtered. The water is therefore forced through the filter into the second of the chambers where it is stored for use in a clean and drinkable form. The primary disadvantage of prior art solutions is leakage and seepage of unfiltered water around and through the filter assembly. In most of these prior art devices water leakage can be a problem and cause contamination. The present invention includes several key elements for avoiding such problems.

A primary objective of the present invention is to provide a portable water filtering system having advantages not taught by the prior art.

Another objective is to provide such a system including a filter assembly made-up of a series of separate disks such that the requisite filter elements may be assembled to achieve the type of filtration necessary for each application.

A further objective is to provide such a system including a means for compressing the filter assembly between certain features so as to exclude water from passing around the filter assembly thereby bypassing the filtration process, and also providing an alternate weep path for any unfiltered water to escape from the filter assembly area.

A further objective is to provide such a system including a means for sealing the individual filter elements so that unfiltered water cannot permeate between the filter elements and thereby bypass any one of them.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE PREFERRED EMBODIMENT

Figure 2:
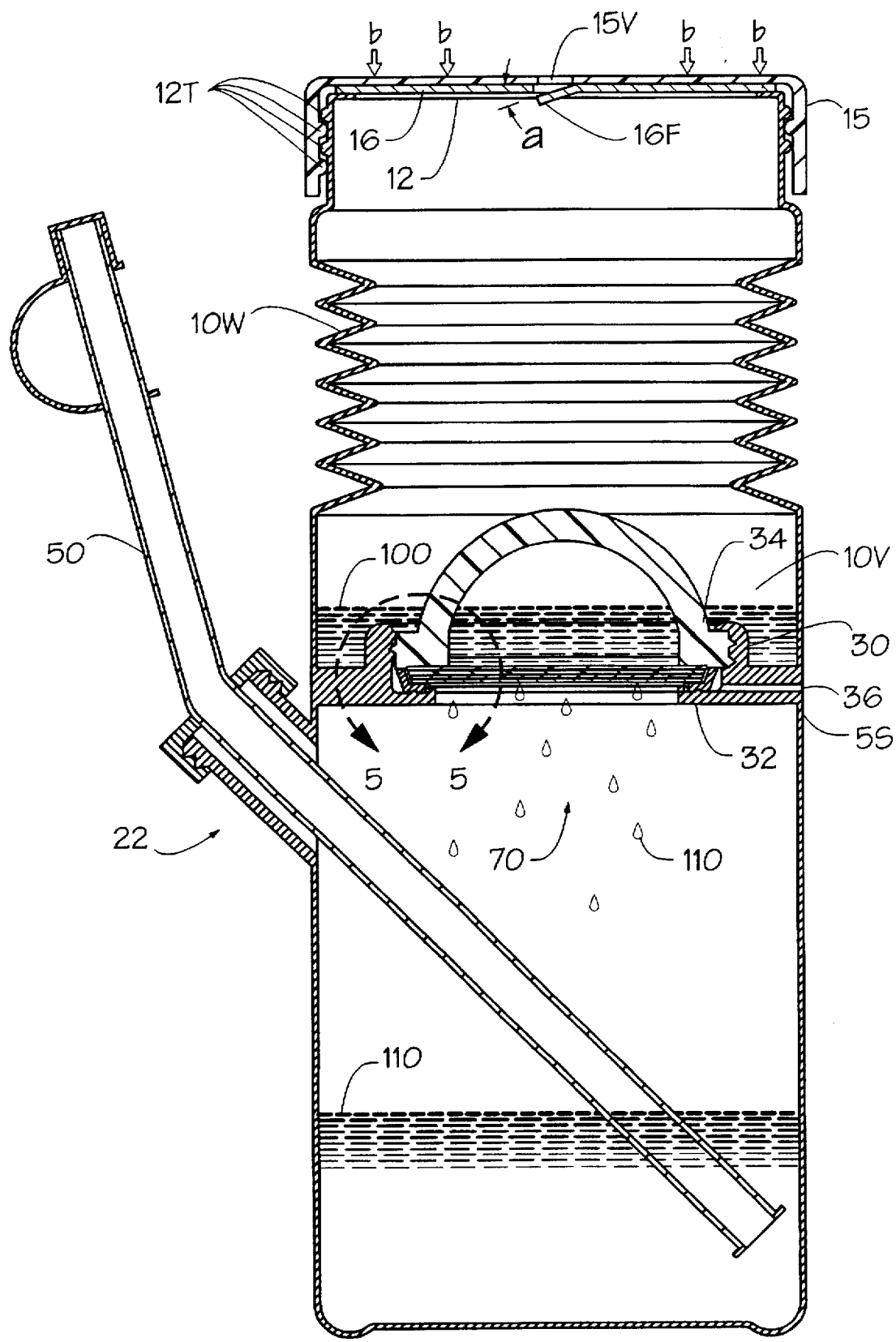
FIG. 2 is a sectional view thereof taken along line 2—2 of FIG. 1.

The above described drawing figures illustrate the invention, a portable water filtering device comprising a container 5 providing a closed first compartment 10 having a first compartment volume 10V and a second compartment 20, where the first 10 and second 20 compartments are separated by a mutual wall 30 as best illustrated in FIG. 2.

Figure 3:
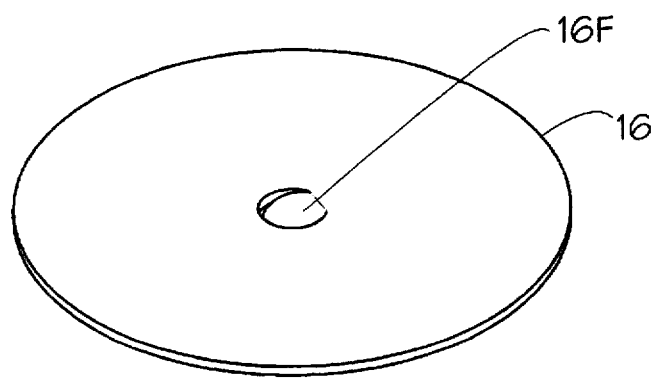
FIG. 3 is a perspective view of a valve thereof.

The first compartment 10 provides a means for water entry 12 into the first compartment 10, such as the open top, best shown in FIG. 2. This open top is closeable by screw-on top element 15 preferably joined to the container 5 over the open top by mutually engaging threads 12T. However, top element 15 includes a vent means 15V clearly shown in FIG. 1, so that the first compartment 10 is not sealed by the top element 15. Instead the first compartment 10 further includes a one-way valve means 16, preferably a disk having a movable flapper 16F, best illustrated in FIG. 3, so that it is capable of drawing air into the first compartment 10 when the first compartment volume 10V is expanded and acting to seal the first compartment 10, when the first compartment volume 10V is pressurized, the flapper 16F being resiliently flexible so as to be movable by air movement toward the vent means 15V to cover the vent means, thus sealing the first compartment 10 as depicted by arrow "a" in FIG. 2 showing the movement range of flapper 16F.

Figure 1:
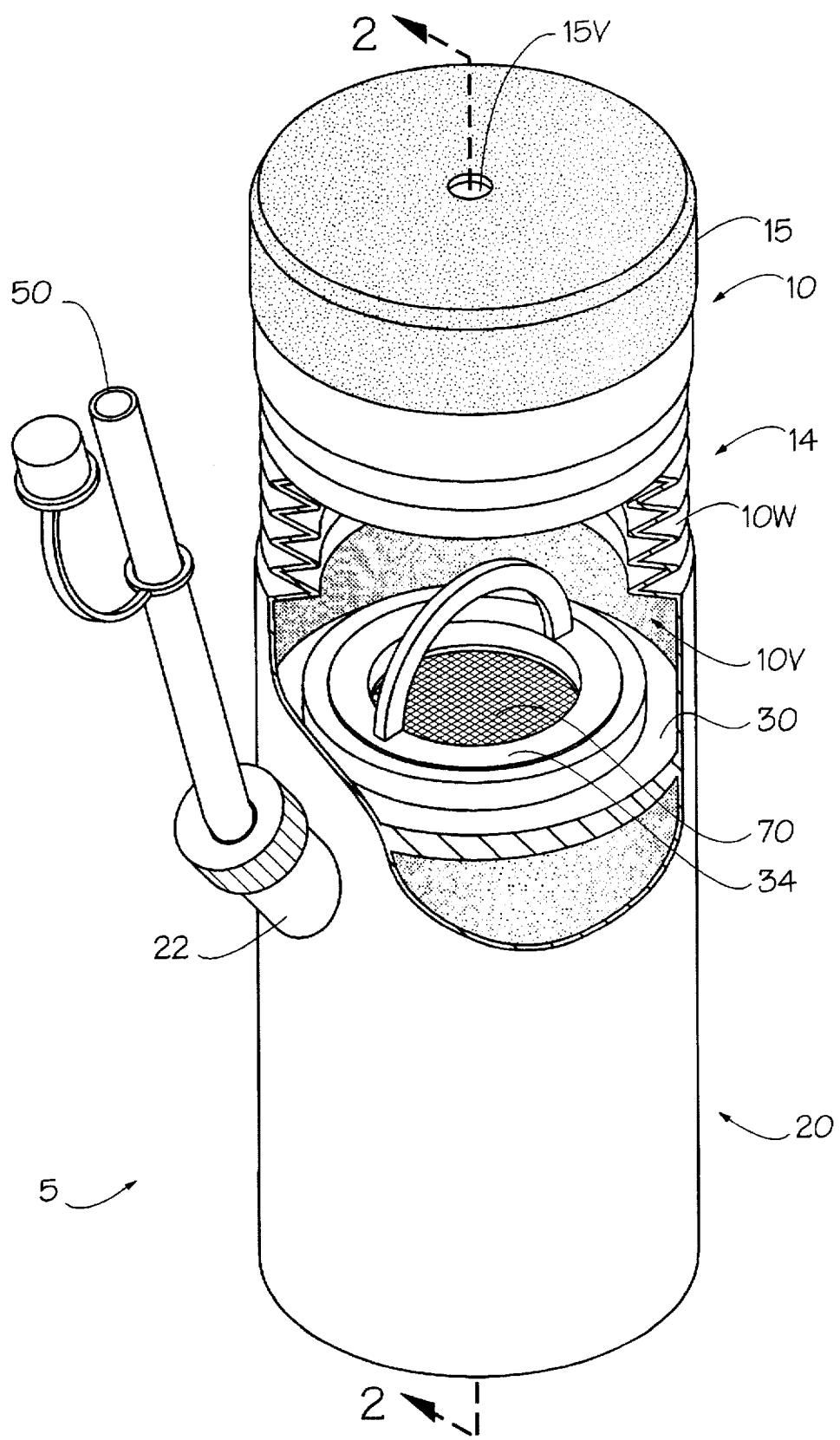
FIG. 1 is a perspective view of the preferred embodiment of the present invention.

The first compartment 10 also includes a means for pressurizing 14 of the first compartment 10 such as the bellows-shaped portion of a side wall 10W shown in FIGS. 1 and 2. The pressurizing means 14 might also be a pump or other pressurization device, but the bellows-shaped portion of the side wall 10W provides for a simple, reliable and low cost approach which is highly effective.

The second compartment 20 provides a means for water exit 22 such as the spout shown in FIGS. 1 and 2. A drinking straw 50 may be positioned within the means for water exit 22 so as to draw filtered water 110 from the second compartment 20. The volume of the second compartment 20 is not variable.

The mutual wall 30 provides an annular protruding lip 32 capable of receiving a means for water filtration 70, so that with water to be filtered enclosed in the first compartment 10, pressurizing of the first compartment 10 forces the water through the filtration means 70 and into the second compartment 20 where it is drain off for use or simply stored for use at a later time.

Figure 4:
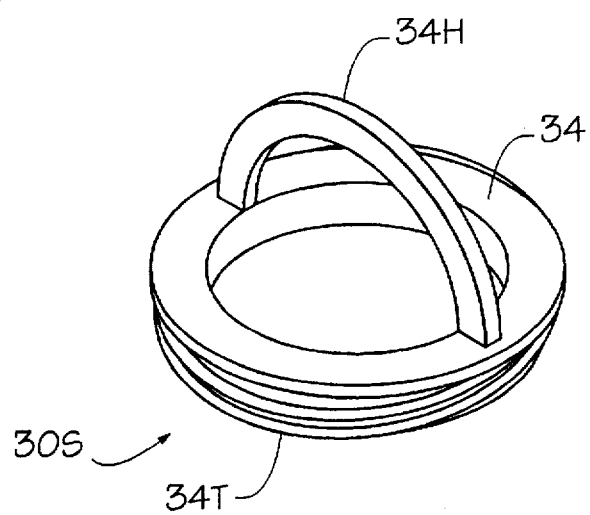
FIG. 4 is a perspective view of a clamping means thereof.
Figure 5:
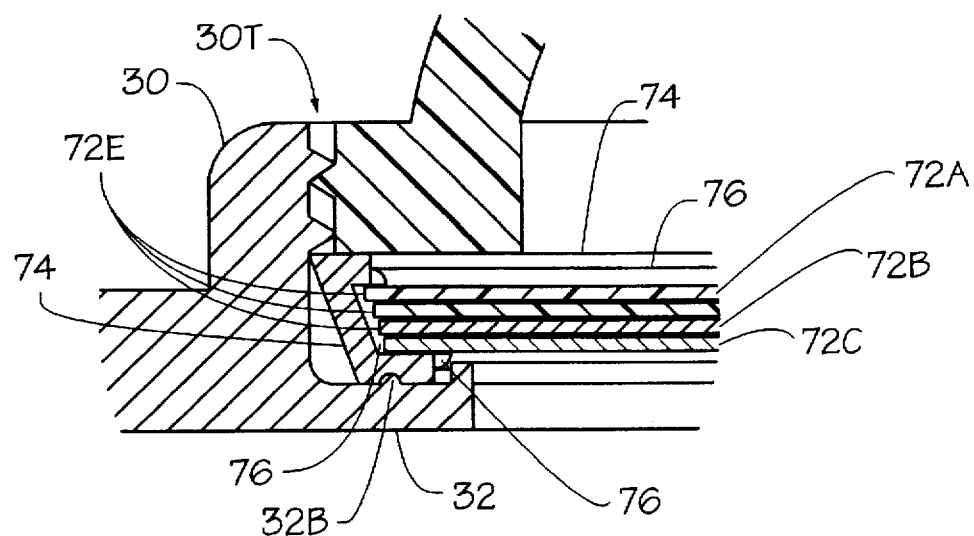
FIG. 5 is a partial section view thereof taken along line 3—3 of FIG. 1.

The filtration means 70, as best seen in FIG. 5, preferably includes at least one coarse filter media 72A, a fine filter media 72B and an activated charcoal filter media 72C. The coarse filter media, the fine filter media and the activated charcoal filter media are arranged as adjacent disk-shaped layers positioned such that the water, forced from the first compartment moves through the coarse filter media first so that gross particulate is captured prior to the free filter media 72B and the charcoal filter media 72C, ensuring long life for the filtration means 70. The filter media 72 may include other types of filtration devices and water treating elements. For instance, in the case where only gross finds need be removed, the filter media might include only a wire mesh filter media. In the case where it is necessary to treat the water for pathogens, a chlorine or iodine containing filter media might be included. Many types of treatment resins and chemical formulations known in water treatment technology might be used in the present invention as the individual application requires. Preferably, the filtration means 70 includes a peripherally positioned annular elastomeric boot 74 such that the peripheral edges 72E of the disk-shaped layers 72 are sealed from water flow between them. In the preferred embodiment, the boot 74 is made of a nitrile or other elastomeric material which is compliant but not subject to mechanical creep so that it is able to be clamped in such a manner that water cannot seep around the filtration means 70. In the present invention, as shown in FIG. 2, the filtration means 70 is positioned on the annular protruding lip 32 of the mutual wall 30 and clamped in place by engaging a clamping means 34 having an external thread 34T as best illustrated in FIG. 4, with an annular internal thread 30T on the mutual wall 30. A handle 34H is used to drive the clamping means 34. The bottom surface 30S of the clamping means 34 is driven into contact with the boot 74 so as to clamp the filtration means 70 between the clamping means 34 and the protruding lip 32, thereby assuring that water cannot escape around the filtration means 70 and also sealing the first compartment 10. Preferably a bead of a sealant 76 such as an epoxy resin is applied to the peripheral edges 72E and to the joint between the nitrile boot 74 and the layers 72A and 72C so as to prevent water from seeping between the boot 74 and the layers 72.

The annular protruding lip 32 of the mutual wall 30 includes an annular bump 32B against which the elastomeric boot 74 is pressed so as to establish a seal between the lip 32 and the boot 74 for sealing the filtration means from water flow around it. In FIG. 2 it is shown that the mutual wall 30 provides a channel 36 communicating between the annular elastomeric boot 74 and an exterior surface 5S of the container 5 for drawing-off water which may become trapped or seep around the filtration means 70.

In use, the filtration means 70 is placed onto the protruding lip 32 of the mutual wall 30 and the clamping means 34 is screwed into the mutual wall 30 until it is tightly wedged against the filtration means 70. Next, water to be filtered 100 is placed into the first compartment 10 and the one-way valve means 16 is placed over the open top 12 of the first compartment 10 and then the top element 15 is screwed into place as shown in FIG. 2. When filtered water is wanted, the top element 15 is pressed downwardly as shown by the several downwardly directed arrows "b" in FIG. 2. This downward force pressurized the first compartment 10 since the bellows-shaped portion of a side wall 10W collapses to accommodate a decrease in the volume 10V of the first compartment 10. The pressure thus developed in the first compartment 10 drives the water 100 through the filtration means 70 and into the second compartment, preferably placed below the first compartment 10. The filtered water 110 in the second compartment is thereafter available for drinking through the straw 50 or for pouring out of the spout 22.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A water filtering device comprising:

a container providing a closed first compartment having a first compartment volume and a second compartment, the first and second compartments being separated by a mutual wall;

the first compartment providing a means for water entry thereinto, and a means for pressurizing the water;

the second compartment providing a means for water exit therefrom; the mutual wall providing a means for water filtration such that with water enclosed in the first compartment, when pressurized, forces the water through the filtration means and into the second compartment thereby storing filtered water in the second compartment;

the pressurizing means enabling the first compartment volume to be expanded and contracted;

the first compartment further including a one-way valve means for drawing air into the first compartment when the first compartment volume is expanded and for sealing the first compartment when the first compartment volume is contracted;

and wherein the mutual wall provides an annular protruding lip the filtration means includes a peripherally positioned elastomeric boot, and a means for pressing the elastomeric boot against the lip for sealing the filtration means from water flow therearound.

2. The device of claim 1 wherein the pressurizing means is a bellows-shaped portion of a side wall of the first compartment.

3. The device of claim 1 wherein the filtration means includes a plurality of filter elements assembled in a selected order so as to receive the water in sequence.

4. The device of claim 3 wherein the filter elements are disc-shaped and includes at least a coarse filter media, a fine filter media and an activated charcoal filter media.

5. The device of claim 3 wherein the filter elements are arranged as adjacent disk-shaped layers positioned such that the water forced from the first compartment moves through the coarse filter media first.

6. The device of claim 5 wherein the filtration means includes a peripherally positioned annular elastomeric boot such that the peripheral edges of the disk-shaped layers are sealed from water flow therebetween.

7. The device of claim 6 wherein the mutual wall provides a channel communicating between the annular elastomeric boot and an exterior surface of the container for drawing-off water passing around the annular elastomeric boot.

8. The device of claim 1 further including a drinking straw positioned within the means for water exit so as to draw the filtered water from the second compartment.

9. A water filtering device comprising:

a container providing a closed first compartment having a first compartment volume and a second compartment, the first and second compartments being separated by a mutual wall;

the first compartment providing a means for water entry thereinto, and a means for pressurizing the water;

the second compartment providing a means for water exit therefrom;

the mutual wall providing a means for water filtration such that with water enclosed in the first compartment, when pressurized, forces the water through the filtration means and into the second compartment thereby storing filtered water in the second compartment;

the mutual wall further providing a channel communicating between the water filtration means and an exterior surface of the container for drawing-off water passing around the water filtration means.

10. The device of claim 9 wherein the pressurizing means is a bellows-shaped portion of a side wall of the first compartment.

11. The device of claim 9 wherein the filtration means includes a plurality of filter elements assembled in a selected order so as to receive the water in sequence.

12. The device of claim 11 wherein the filter elements are disc-shaped and include at least a coarse filter media, a fine filter media and an activated charcoal filter media.

13. The device of claim 11 wherein the filter elements are arranged as adjacent disk-shaped layers positioned such that the water forced from the first compartment moves through the coarse filter media first.

14. The device of claim 13 wherein the filtration means includes a peripherally positioned annular elastomeric boot such that the peripheral edges of the disk-shaped layers are sealed from water flow therebetween.

15. The device of claim 14 wherein the mutual wall provides an annular protruding lip and a means for pressing the elastomeric boot thereagainst for sealing the filtration means from water flow therearound.

16. The device of claim 14 wherein the mutual wall provides a channel communicating between the annular elastomeric boot and an exterior surface of the container for drawing-off water passing around the annular elastomeric boot.

17. The device of claim 9 further including a drinking straw positioned within the means for water exit so as to draw the filtered water from the second compartment.

\* \* \* \* \*